March 11, 1952 H. F. HOBBS ET AL 2,588,724
FRICTION CLUTCH AND BRAKE
Filed Nov. 16, 1948 2 SHEETS—SHEET 1
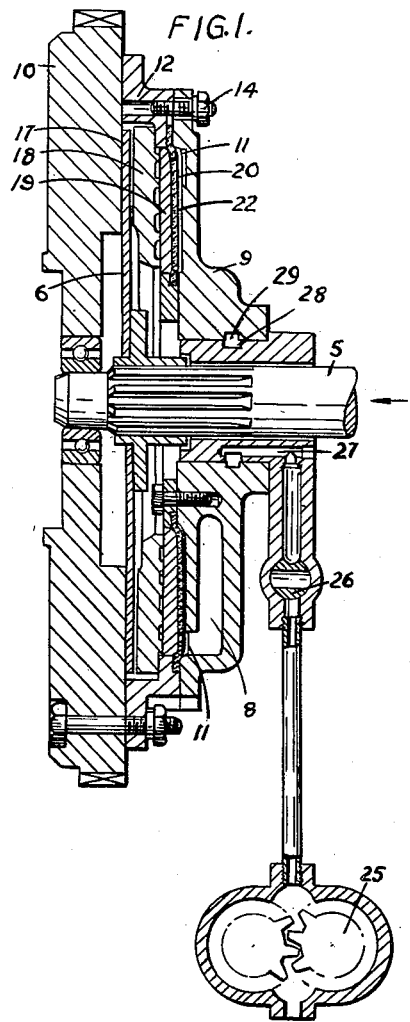
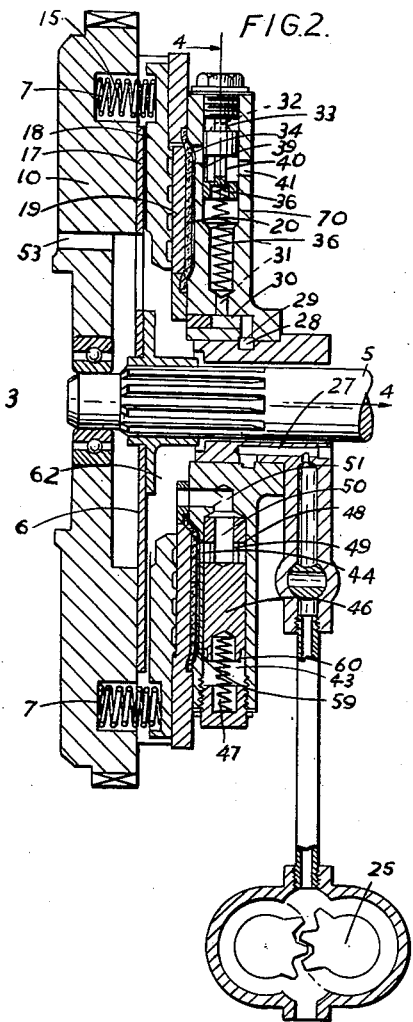
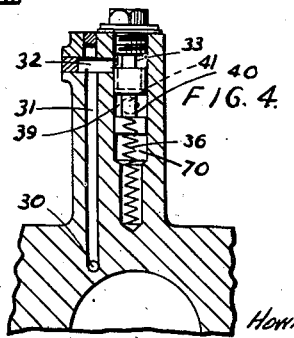
Inventors
HOWARD F. HOBBS & JOSEPH A. THOMPSON
By
Attorneys

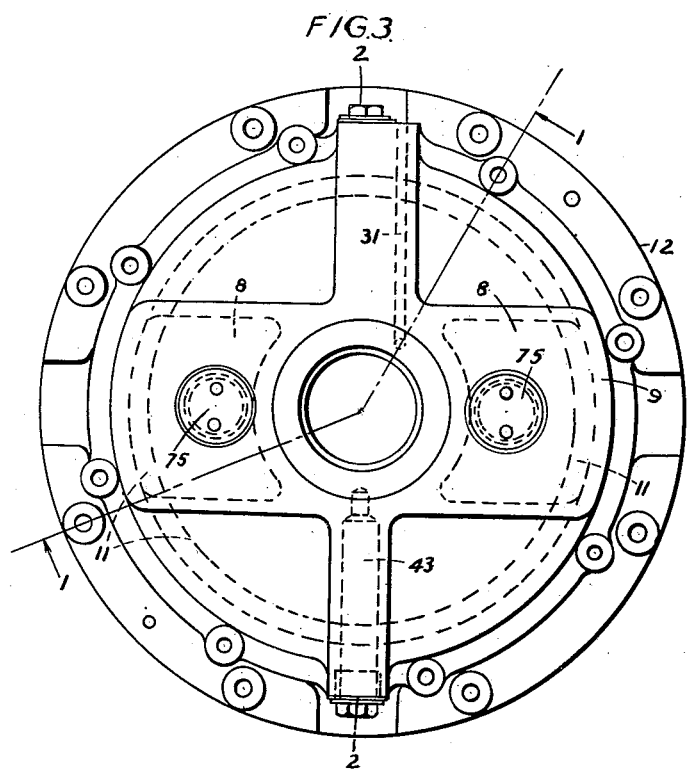

Patented Mar. 11, 1952

2,588,724

UNITED STATES PATENT OFFICE 2,588,724

FRICTION CLUTCH AND BRAKE

Howard Frederick Hobbs and Joseph Arthur Thompson, Leamington Spa, England, assignors to Hobbs Transmission Limited, Leamington Spa, England Application November 16, 1948, Serial No. 60,236
In Great Britain November 26, 1947

2 Claims. (Cl. 192—85)

This invention relates to hydraulically actuated friction clutches or brakes of the kind having an input member and an output or reaction member, a housing carried by one of said members, friction elements carried by the housing, one or more opposing friction elements carried by the other of said members, and a flexible diaphragm or one or more pistons carried by the housing and by means of which the pressure of oil or other liquid in a space (which we term a liquid actuating space) provided in the housing is utilised for urging the friction elements together, to engage the said opposing friction element, means being provided for supplying the oil or other liquid to the liquid actuating space when required.

It has been proposed in clutches of this kind to employ resilient devices associated with the parts carrying the friction surfaces so that delivery of a certain volume of liquid to an actuating member is required to engage the clutch fully. Known devices have, for example, taken the form of coil springs mounted between a pressure plate and another element or segments of thin metal plate bent to such shape as to allow compression and movement of an actuating member or members. Another method is to employ plates of conoidal form. These methods involve additional cost and complication as well as increased weight and size. Another disadvantage with springs of this nature is an additional movement of the diaphragm or pistons and other parts which is necessitated in compressing the resilient parts.

According to the present invention one or more air containing cavities are formed in the rotary housing of the clutch or brake, said cavities being in communication with the liquid actuating space at or near to the outermost part of this space whereby air trapped in the cavity is compressed during filling of the space and engagement of the friction surfaces.

The housing may be provided with ducts leading to the aforesaid space and may also carry a spring operated centrifugally balanced valve which serves to open the space either to the ducts or to an exhaust port. The exhaust port, the valve, the space, and the air containing cavities will be so arranged that when the space is opened to exhaust by the valve, the cavities will be in communication with the exhaust port so that the cavities may be maintained filled with air. For this purpose it is necessary that there be a free passage between the cavities and the exhaust port, i. e. a passage having no part in which the liquid might be trapped so as to prevent free circulation of the air. The centrifugal action on the liquid within the space and cavities due to the rotation of the housing will tend to maintain the air in the cavities and separated from the liquid which will tend to remain in the parts of greater diameter.

In order that the invention may be readily carried into effect a constructional form thereof will now be described by way of example with reference to the accompanying drawings, wherein:

Figure 1 is a sectional view on line 1—1 on Figure 3 of a clutch made in accordance with the present invention, and showing one of the air containing cavities;

Figure 2 is a sectional view on line 2—2 on Figure 3 of the clutch showing a spring operated centrifugally balanced valve; and Figure 3 is an elevation view of parts marked 9 to 12 in Figure 1 looking in the distance of the arrow 3 on Figure 1; and, Figure 4 is a part sectional view on the line 4—4 on Figure 2 showing the valve and arrangement of the liquid ducts.

The flywheel of a motor car engine 10 constitutes an input member of the clutch and carries a ring 12 to which the clutch housing plate 9 is fixed by bolts 14. The parts 10, 12, 9, together form the housing carried by the input member. An output member or shaft 5 carries the opposing friction element or clutch spinner plate 6. The friction elements carried by the housing consist of the inner surface of the flywheel 10 and a pressure plate 18. The pressure plate 18 is urged away from the spinner plate by springs 7 but can be pressed into clutch engagement by hydraulic pressure in an annular liquid actuating space 22 in the plate 9 which acts through a rubber-like ring-shaped diaphragm 20 which is clamped over the space at its inner and outer diameters, and an insulating ring 19. Air containing cavities 8 are formed in the plate 9. A groove 11 serves to provide an unrestricted passage from the cavities 8 to a valve chamber 70. This valve chamber contains a valve block 40 which has a deep groove 39 leaving piston like parts on opposite sides of the groove.

Oil under pressure is supplied from a pump 25 which may be driven from the engine or from the rotary housing 9 through valve 26, ducts 27, grooves 28, 29 and ducts 30, 31, 32 (see Figure 4) to the outer end of the valve 40. The valve chamber 70 is provided with an entry port 34 which is in communication with the space 22 and with an exhaust port 41. The valve block 40 is urged outwards by a spring 36 and when in its outer position the port 34 is in communication with the groove 39 thereby opening the space 22 to exhaust. The outer end of the bore is closed by a plug, having an extension 33 which acts as a stop for the valve 40. The clutch housing also carries a valve block 46 in a valve chamber 43. This valve is urged inwards by a spring 47. A port 44 leads from the actuating space 22 and when the valve is in its innermost position aligns with a groove 48 formed in the valve block 46. Ducts 49, 50, and 51 lead from the groove to the space 62 within the clutch assembly. The liquid actuating space 22 is in communication with the outer end of the valve chamber 43 by means of a hole 59, the valve 46 being reduced in diameter at its outer end as shown at 60.

In operation the valve 26 may be positioned to open the liquid pressure from the pump to the duct 27, grooves 28, 29, and ducts 30, 31, 32 whereupon the pressure acts on the outer end of the valve 40 causing it to move inwards against the spring 36 until the outer end of the valve passes beyond the entry port 34 thereby allowing the liquid to enter the space 22. Since the space 22 is rotating the liquid therein will be subjected to centrifugal force and will exert a pressure on the air within the cavities 8. As the space fills, the pressure will increase and further compress the air. The pressure acting on the diaphragm 20 is transmitted by the insulator plate 19 to the pressure plate 18 causing the springs to be overcome and the plate 17 engaged. The pressure urging the friction surfaces together will depend on the pressure acting in the space and in the air cavities 8 and will, therefore, increase as the liquid flows in the cavities and causes further compression of the air. To compress the air to any given pressure the space which is occupied in the cavities must be proportionately reduced, and a certain quantity of liquid must, therefore, be delivered by the pump 25 to produce any given pressure at the friction surfaces. The capacity of the spaces will be suitably proportioned in relation to the quantity of liquid delivered by the pump to ensure that the full engaging pressure cannot be applied in less than some predetermined interval of time.

It should be understood that pressure will be built up gradually during the filling of the space since the total pressure due to centrifugal motion will increase gradually. The air cavities tend to reduce the rate of filling since the air will be compressed during filling, but the main purpose of the cavities is to prevent a sudden increase in pressure as the space becomes filled and the full pressure from the pump tends to act within the space in addition to that due to the centrifugal action. At low speeds the pressure urging the friction surfaces together will be largely provided by the pump, but at higher speeds the pressure due to centrifugal force will be greater.

The valve block 40 and the spring 36 are made of such mass that the centrifugal force acting thereon and tending to move the valve outwards is equal to the centrifugal pressure developed in the ducts 30, 31, 32 tending to move the valve inwards. If the valve 26, therefore, is moved to the shut position the spring 36 will cause the valve block 40 to move outwards thereby uncovering the exhaust 41. The liquid in the space 22 is then exhausted through port 34, groove 39 and exhaust 41, and the friction surfaces are disengaged. The centrifugal action assists the emptying of the space and the springs 15 cause the pressure plate to move to the disengaged position. When the space is emptied the cavities 8 are in communication with the atmosphere by means of channel 11, entry port 34, and exhaust port 41, and any air that may have been lost will be replenished.

The valve 46 serves to automatically disengage the clutch over a given range of engine idling speeds and the vehicle may be brought to rest and started without need for operation of the control valve 26. When idling the spring 47 holds the valve 46 in its innermost position as shown in Figure 2 and in this position the ports 48 align with the port 44 and the liquid being delivered to the space can pass through the ducts 50, 51 and circulate through the parts of the clutch and over the friction surfaces. It will be observed that the ducts open at lesser radius than the space and hence the space is maintained filled with liquid, which during the idling condition circulates through the ducts and space and the parts of the clutch. An increase in speed will cause the valve 46 to move outwards, the centrifugal force thereon overcoming the spring, and the groove 48 will pass outwards beyond the port 44, thereby causing automatic engagement of the clutch. In these circumstances the space will be already filled, but before the full pressure can be applied to the friction faces the air in the cavities 8 must be compressed. During the initial phase of engagement and when idling the air in the space will be under low pressure, and in these circumstances the air containing cavities provide a smoothing effect and tend to absorb any pressure fluctuations produced in the circulating liquid, which might otherwise tend to cause an irregular partial engagement of the friction surfaces. It will be understood that although the groove 48 aligns with the port 44, there is some pressure in the space due to centrifugal action and back pressure.

The purpose of the hole 59 is to connect the outer end of the bore 43 with the space over part of the travel of the valve 46. This causes the pressure in the space to act on the outer end of the valve over the first part of its outwards travel, and thereby provide a pressure responsive effect. When the reduced diameter 60 moves outwards beyond the hole 59 the liquid in the bore 43 becomes trapped and must leak away as the valve moves outwards. This damps the travel of the valve and assists in producing smooth engagement of the friction surfaces. The oil will leak away over the cylindrical surface of the valve block and this will have a sufficiently loose fit in the valve chamber for this purpose.

The pump 25 is provided with a relief valve. The liquid passing through the relief valve may be led to the space within the clutch.

Friction clutches and brakes constructed according to the invention may constitute parts of variable ratio power transmission apparatus.

It will be observed that the plate 9 constituting part of the housing is formed with two cavities 11 offset 180° from each other and are connected by the annular groove 11 which is formed in the inner side of the plate 9 and also provides communication with the space 22. The liquid actuating space 22 is also formed in the inner side of this plate 9, this space being covered by the flexible diaphragm 20. The cavities are offset from each other 180° and the axes of the two valves are offset from each other also by 180° and are offset 90° from the mean radii of the cavities. Thus the essential shapes required for the valves, cavities, groove 11 and space 22, are all conveniently provided in a single cast plate in a manner suitable for casting and machining and providing a well balanced construction. Holes may be provided in the plate 9 to facilitate coring and casting and these holes may be subsequently filled in by plugs 75.

We claim:

1. A hydraulically actuated clutch comprising a rotary input member, a rotary output member, a housing carried by one of said members, a friction element carried by the other of said members within said housing, a plate carried by said housing and enclosing said friction element in said housing, said plate having a fluid actuating space therein adjacent the face of the friction element, an axially resilient member enclosing said actuating space for engaging said friction element, pump means for supplying fluid under pressure to said actuating space, centrifugal action on the fluid in said actuating space providing at least part of the engaging pressure, a valve for controlling the supply of fluid under pressure from said pump to said actuating space, two radially disposed chambers in said plate offset 180° in respect to each other, means in said plate communicating with said chambers and with said actuating space near the outer ends thereof, said chambers containing air which is trapped and compressed therein by the fluid supplied to the actuating space during engagement of said resilient member and said friction element, valve means in said plate for controlling the supply of fluid under pressure from said pump and said actuating space, said valve means having an exhaust port for discharging fluid from said actuating space when said supply valve is closed whereby said actuating space is in communication with the atmosphere for replenishment of the air in said chambers, and a spring-urged centrifugally operated valve in said plate offset 180° in respect to said valve means, said valve having exhaust ports associated therewith in said plate for relieving the pressure in said actuating space and said chambers over a predetermined range of speeds.

2. A hydraulically actuated clutch comprising a driving member, a driven member, a housing carried by one of said members, a friction element carried by the other of said members, clutch means carried by said housing for engaging said friction element, hydraulically operating clutch actuating means having a space to receive liquid under pressure for operating said actuating means for causing said clutch means to engage said friction element, means for supplying liquid under pressure to a pressure space of said space, valve means for controlling inlet of liquid to said space and exhaust of liquid from said space, said valve means including an exhaust opening adjacent the radially outer part of said space so that the liquid is exhausted from said space by centrifugal action, at least one air receiving chamber in said housing, and means providing communication between the radially outer part of said chamber with the radially outer part of said space and said actuating means, said chamber containing air which is trapped and compressed therein by the liquid supplied to the said space during engagement of said actuating means and friction element, said space chamber being completely exhausted during disengagement to permit re-filling of air through said space into said chamber.

HOWARD FREDERICK HOBBS.
JOSEPH ARTHUR THOMPSON.

REFERENCES CITED

The following references are of record in the file of this patent:

UNITED STATES PATENTS

| Number | Name | Date |
|---|---|---|
| 731,483 | Matson | June 23, 1903 |
| 1,157,793 | Metten | Oct. 26, 1915 |
| 1,786,856 | Madden | Dec. 30, 1930 |
| 2,143,321 | Kegresse | Jan. 10, 1939 |
| 2,163,203 | Kegresse | June 20, 1939 |
| 2,199,523 | Kegresse | May 7, 1940 |
| 2,275,204 | Smirl | May 3, 1942 |
| 2,354,174 | Schmitter | July 18, 1944 |
| 2,375,855 | Lambert | May 15, 1945 |
| 2,440,589 | Kegresse | Apr. 27, 1948 |
| 2,535,924 | Hobbs | Dec. 26, 1950 |
| 2,556,809 | Hobbs | June 12, 1951 |

FOREIGN PATENTS

| Number | Country | Date |
|---|---|---|
| 541,445 | France | July 27, 1922 |